United States Patent
Boettcher et al.

(10) Patent No.: US 6,462,296 B1
(45) Date of Patent: Oct. 8, 2002

(54) CIRCUIT BREAKER ARRANGEMENT, IN PARTICULAR AIR-INSULATED CIRCUIT BREAKER DRAWER ARRANGEMENT IN MEDIUM-VOLTAGE TECHNOLOGY

(75) Inventors: Martin Boettcher, Berlin; Volker Kopke, Bukenhof; Walter Spies, Herzogenaurach; Herbert Sons, Möhrendorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/581,724
(22) PCT Filed: Nov. 20, 1998
(86) PCT No.: PCT/DE98/03487
§ 371 (c)(1),
(2), (4) Date: Jan. 8, 2001
(87) PCT Pub. No.: WO99/31776
PCT Pub. Date: Jun. 24, 1999

(30) Foreign Application Priority Data

Dec. 16, 1997 (DE) .......................... 197 57 402

(51) Int. Cl.$^7$ ................................. H01H 3/00
(52) U.S. Cl. .................... 218/154; 200/50.21
(58) Field of Search ................. 218/152, 153, 218/154, 140; 200/50.21–50.25

(56) References Cited

U.S. PATENT DOCUMENTS

| | | | | |
|---|---|---|---|---|
| 3,188,415 A | * | 6/1965 | Netzel ...................... | 200/50.23 |
| 4,317,160 A | * | 2/1982 | Tillson et al. ................ | 361/399 |
| 4,412,112 A | * | 10/1983 | Ishikawa et al. .......... | 200/50.21 |
| 4,449,021 A | * | 5/1984 | Wakayama et al. ...... | 200/50.21 |
| 4,477,701 A | * | 10/1984 | Castonguay et al. ........ | 361/335 |
| 4,677,524 A | | 6/1987 | Masazumi et al. | |
| 5,278,722 A | * | 1/1994 | Peruso ..................... | 200/50.21 |
| 5,481,075 A | * | 1/1996 | Kleinecke ................ | 200/50.24 |
| 5,721,406 A | * | 2/1998 | Book et al. .............. | 200/50.24 |

FOREIGN PATENT DOCUMENTS

DE 196 33 524 2/1998

OTHER PUBLICATIONS

Siemens. "Leistungsschlter–Einschubanlagen bis 24kV, Typ 8BK20," Mittelspannungsanlagen, Katalog HA 25.21, 1993, No month.

* cited by examiner

Primary Examiner—Lincoln Donovan
(74) Attorney, Agent, or Firm—Kenyon & Kenyon

(57) ABSTRACT

A circuit breaker arrangement, in particular, an air-insulated medium-voltage switching arrangement having function features including "circuit breaking," "disconnection" and "grounding" features, is described. The circuit breaker arrangement includes a switching module that is formed from function-oriented modular components. The module components including a base module component, a pole module component and a drive module component. The base module component is fixedly connected with the drive module component; the pole module component is arranged so as to be movable in a strait line thereon. Such a circuit breaker arrangement is used for energy supply and distribution, in particular, in medium voltage technology.

5 Claims, 1 Drawing Sheet

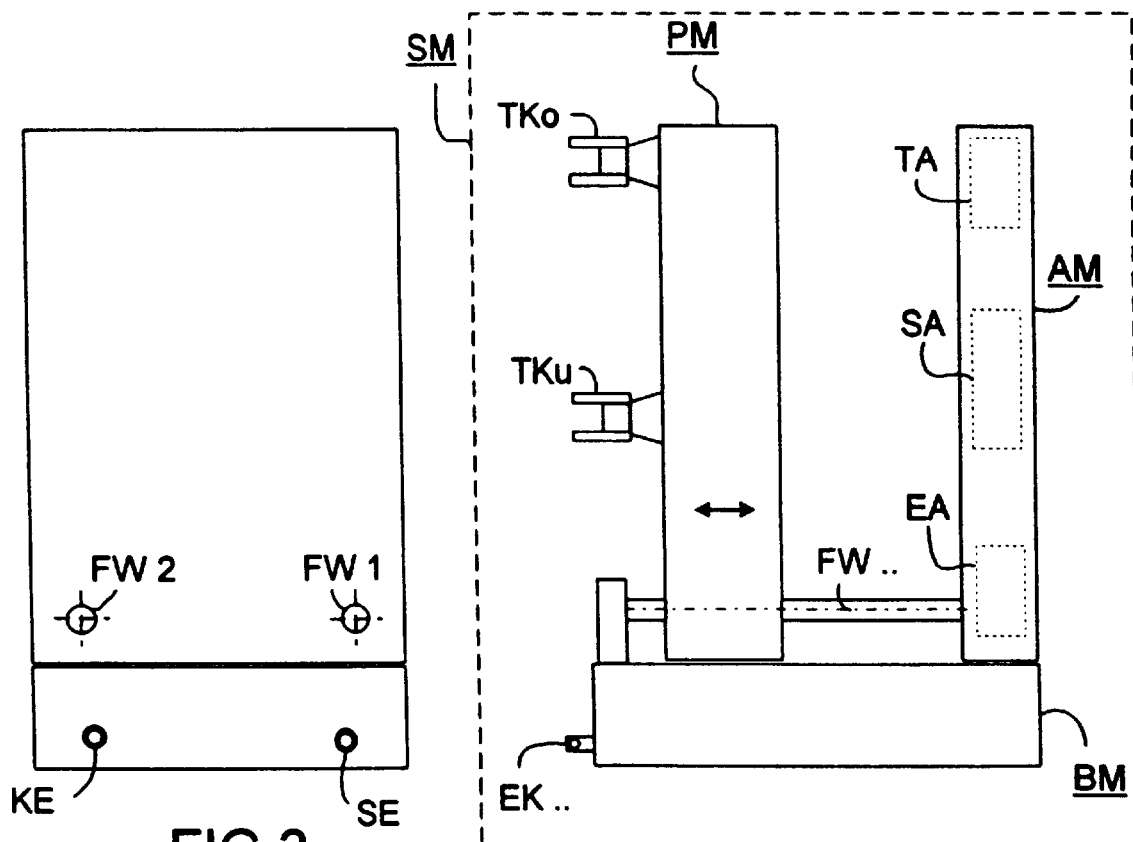
FIG 3
FIG 1
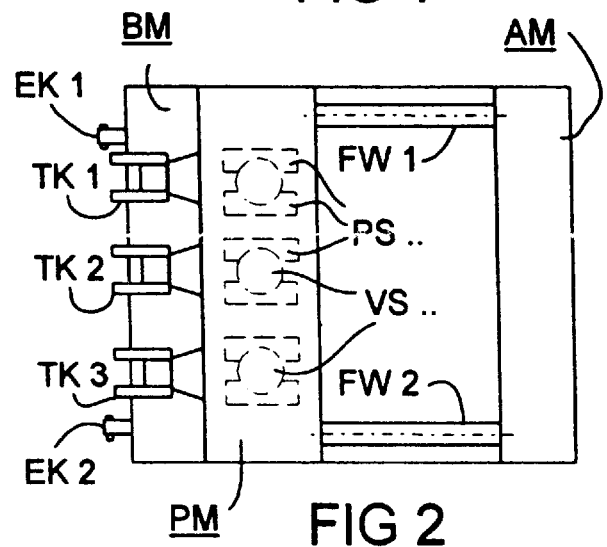
FIG 2

CIRCUIT BREAKER ARRANGEMENT, IN PARTICULAR AIR-INSULATED CIRCUIT BREAKER DRAWER ARRANGEMENT IN MEDIUM-VOLTAGE TECHNOLOGY

CROSS-RELATED TO RELATED APPLICATIONS

This application is a national stage entry of PCT/DE(*/03487 internationally filed Nov. 2 1998.

FIELD OF THE INVENTION

The present invention relates to a circuit breaker arrangement, in particular an air-insulated circuit breaker drawer arrangement in medium-voltage technology, having the functional features "circuit breaking", "disconnection" and "grounding."

BACKGROUND INFORMATION

A circuit breaker arrangement of this type is described in e.g., the Siemens AG reference "Mittelspannungsanlagen, Katalog HA 25.21, 1993."

The drawer of the circuit breaker arrangement is made up of a central truck (carriage) that, in various embodiments, accepts corresponding drawers, and that in the drawn-out state can be removed entirely from the drawer space of the circuit breaker arrangement. According to their function, the drawers can be vacuum circuit breaker drawers, vacuum switch drawers, vacuum contactor drawers, or bridge (jumper) element drawers, for disconnectors.

The drawer space is separated from the adjacent switchboard panels by separating walls, and can be closed using a door that is set in the front frame. The, the movable parts are matched to the wide variety of drawer constructions through the various arrangement types, so that a multiplicity of different designs are provided for these circuit breaker arrangements.

SUMMARY

An object of the present invention is to limit significantly the multiplicity of types of such circuit breaker arrangements, and in particular to simplify the overall mechanical construction of these circuit breaker arrangements, without having to adopt limitations with regard to the performance features. According to the present invention, this is achieved by the following features:

the circuit breaker arrangement contains a switching module that is formed from function-oriented module components, the function-oriented module components are realized by a base module component, a pole module component and a drive module component, the base module component is connected fixedly with the drive module component, while the pole module component is arranged so as to be movable in a straight line thereon.

The function-oriented division into module components creates an arrangement configuration with which the various arrangement components can be realized in a standardized construction. The switching module, in which the base module component can be connected fixedly with the drive module component and the pole module component can be moved in a straight line due to the action of the drive module component on the base module component, is to be manufactured in a standardized manner of construction, independent of the function of the drawer as a vacuum circuit breaker, as a vacuum switch, as a vacuum contactor or as a bridge element. This also holds correspondingly for the pole module and for the various drives of the circuit breaker arrangements.

According to an example embodiment of the present invention, the following features are provided:

the pole module component is equipped with a number of vacuum circuit breakers, vacuum switches, vacuum contactors or bridge elements—each connected with an upper and with a lower disconnecting contact—that corresponds to the number of phases to be switched, the drive module component is provided with a disconnecting drive that moves the pole module component on guide shafts (rails) of the base module component, the drive module component has a switch drive or contactor drive that jointly actuates the movable contacts of the vacuum circuit breakers, of the vacuum switches, or of the vacuum contactors, the drive module component has, respectively, a ground electrode drive for controlling a cable terminal ground electrode power train (drive train) and for controlling a busbar grounding switch power train.

Using the disconnecting drive, which is independent of the switching drive or contactor drive, the motion sequences on the guide shafts can be controlled easily, and separately if necessary, using simple and reliable locking mechanisms. The separate ground electrode drive for the cable terminal ground electrode power train and for the busbar grounding switch power train additionally enables further design simplifications. Thus, for example the drives can be retrofitted as a complete module, according to the design of the arrangement, or can also be omitted if they are not needed.

According to another example embodiment of the present, the following features are provided:

in the base module component, the cable terminal ground electrode power train and the busbar grounding switch power train are each arranged so as to run parallel to the guide shafts, and are arranged underneath them, in the area of the disconnection contacts, the cable terminal ground electrode power train and the busbar grounding switch power train each have a separate grounding switch coupling.

Using the cable terminal ground electrode power train arranged underneath and parallel to the guide shafts, and using the busbar grounding switch power train, which are each provided with a separate grounding switch coupling in the area of the disconnecting contacts, the transmission of force can be coupled in fully effective fashion to the cable terminal ground electrodes and to the busbar grounding switches of the circuit breaker arrangement, using simple means.

An additional advantageous development of the present invention provides the following features:

the vacuum circuit breakers, the vacuum switches, the vacuum contactors or the bridge elements are arranged with their longitudinal axes at a right angle to the plane of the base module component, and with their disconnecting contacts parallel to the direction of travel of the pole module component, the vacuum circuit breakers, the vacuum switches, the vacuum contactors or the bridge elements are respectively fixed on the pole module component by two pole columns (supports) that face one another and that partially enclose them.

This arrangement of the vacuum circuit breakers, the vacuum switches, the vacuum contactors or the bridge elements on the pole module component realizes a very compact switching module for the circuit breaker arrangement, with a minimal space requirement.

BRIEF DESCRIPTION OF THE DRAWINGS

FIG. 1 shows a side view of the switching module of the circuit breaker arrangement, FIGS. 2 and 3 show the switching module of the circuit breaker arrangement in a top view and in a front view.

DETAILED DESCRIPTION

FIG. 1 shows switching module SM of the circuit breaker arrangement, made up of base module component BM, pole module component PM and drive module component AM. Using drive module component AM, pole module component PM is arranged on base module component BM so as to be movable along guide shafts FW . . . in the direction of the arrow. In addition, pole module component PM is equipped with upper and lower disconnecting contacts Tko, Tku, which interrupt, by disconnection, the supply current circuit when pole module component PM is removed from opposed contacts (not shown). In addition, it can be seen that drive module component AM includes disconnecting drive TA, switch drive or contactor drive SA and ground electrode drive EA.

In addition, base module component BM is equipped with grounding switch couplings EK . . . .

As shown in FIG. 3, it can be seen that switching module SM (FIG. 1) of the circuit breaker arrangement is equipped with busbar grounding switch power train SE and with cable terminal ground electrode power train KE, which are positioned respectively underneath first and second guide shafts FW1, FW2. In addition, as shown in FIG. 2, that first grounding switch coupling EK1 is allocated to busbar grounding switch power train SE (FIG. 3) in the plane of disconnecting contacts TK1, TK2, TK3, while cable terminal ground electrode power train KE (FIG. 3) in the same plane contains additional grounding switch coupling EK2.

In addition, as shown FIG. 2, seen that the vacuum circuit breakers, the vacuum switches, the vacuum contactors, or bridge elements VS . . . are each partially enclosed by two pole columns PS, and that the vacuum circuit breakers, the vacuum switches, the vacuum contactors, or bridge elements VS . . . on pole module component PM (FIG. 1) are positioned with their longitudinal axes perpendicular and adjacent to one another on base module component BM.

Such a construction of switching module SM achieves a compact overall construction of the circuit breaker arrangement, which, particularly advantageously, results so as to be functionally independent of the various arrangement types, due to the standardized design.

What is claimed is:

1. A circuit breaker arrangement, comprising:
a switching module formed from function-oriented module components, the function-oriented components including a base module component, a pole module component and a drive module component, the drive module component including a disconnecting drive and a contactor drive, the base module component being fixedly connected to the drive module component, the pole module being arranged so as to be moveable relative to the base module component and the drive module component in a straight line.

2. The circuit breaker arrangement according to claim 1, wherein the circuit breaker arrangement is an air-insulated circuit breaking drawer arrangement in medium-voltage technology having functional features including "circuit breaking", "disconnection" and "grounding".

3. A circuit breaker arrangement, comprising:
a switching module formed from function-oriented module components, the function-oriented components including a base module component, a pole module component and a drive module component, the base module component being fixedly connected to the drive module component, the pole module component being arranged so as to be moveable relative to the base module component and the drive module component in a straight line;
wherein the pole module component includes one of: i) circuit breakers, ii) vacuum switches, iii) vacuum contactors, and vi) bridge elements, each of which is connected with an upper and a lower disconnecting contact, a number of the one of the circuit breakers, vacuum switches, vacuum contactors and bridge elements corresponding to a number of phases to be switched; and
wherein the drive module component includes a disconnecting drive that moves the pole module component on guide shafts of the base module component, the drive module component further including a switch or contactor drive that jointly actuates movable contacts of the one of the i) vacuum circuit breakers, ii) vacuum switches, iii) vacuum contactors and iv) bridge elements, the drive module component further including a ground electrode drive for controlling a terminal ground electrode power train and controlling a busbar grounding switch power train.

4. The circuit breaker arrangement according to claim 3, wherein the base module component, the cable terminal ground electrode power train, and the busbar grounding switch power train are each arranged so as to run parallel to guide shafts and are arranged underneath the guide shafts.

5. The circuit breaker arrangement according to claim 3, wherein the at least one of the: i) vacuum circuit breakers, ii) vacuum switches, iii) vacuum contactactors and iv) bridge elements are respectively fixed on the pole module component by two pole columns that face one another and are respectively partially enclosed by that two pole columns.

* * * * *